United States Patent
Arai et al.

(10) Patent No.: US 6,422,365 B2
(45) Date of Patent: Jul. 23, 2002

(54) POWER TRANSMISSION SYSTEM FOR FOUR-WHEEL DRIVE VEHICLES

(75) Inventors: Kentaro Arai; Rikiya Kunii, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 14 days.

(21) Appl. No.: 09/725,937

(22) Filed: Nov. 30, 2000

(30) Foreign Application Priority Data

Dec. 3, 1999 (JP) .......................................... 11-345278

(51) Int. Cl.$^7$ .............................................. B60K 17/34
(52) U.S. Cl. ..................... 192/35; 192/48.3; 192/103 R; 180/233
(58) Field of Search ............................... 192/35, 103 R, 192/93 A, 70.19, 70.2, 43, 44, 48.3, 49; 180/233

(56) References Cited

U.S. PATENT DOCUMENTS

| | | | |
|---|---|---|---|
| 5,584,776 A | * 12/1996 | Weilant et al. | 180/233 |
| 5,884,738 A | * 3/1999 | Joslin et al. | 192/35 |
| 5,915,513 A | * 6/1999 | Isley et al. | 180/247 |
| 6,062,361 A | * 5/2000 | Showalter | 192/35 |
| 6,315,096 B1 | * 11/2001 | Dairokuno et al. | 192/35 |

FOREIGN PATENT DOCUMENTS

JP 09-202152 8/1997

* cited by examiner

Primary Examiner—Saul Rodriquez
(74) Attorney, Agent, or Firm—Armstrong, Westerman & Hattori, LLP

(57) ABSTRACT

In a power transmission system for a four-wheel drive vehicle, a multiple disk clutch for distributing a proportion of the torque of the front wheels to the rear wheels is provided between a driving shaft which is connected to the front wheels which are main driven wheels and a driven shaft which is connected to the rear wheels which are auxiliary driven wheels. Between the driving shaft and the driven shaft a torque cam mechanism, a hydraulic pump and a bidirectional clutch mechanism are provided, in that order. When the rotational rate of the front wheels exceeds the rotational rate of the rear wheels, the bidirectional clutch mechanism is engaged, a first rotor of the hydraulic pump which is operatively connected to the front wheels and a second rotor which is operatively connected to the rear wheels rotate relative to each other, and a rotational load is generated by a hydraulic circuit. A first cam element and a second cam element of the torque cam mechanism rotate relative to each other as a result of the above-mentioned rotational load so as to generate a thrust force, and this thrust force causes engagement of the multiple disk clutch so as to put the vehicle into a four-wheel drive mode. It is thus possible to decrease the torque transmission capacity of the bidirectional clutch mechanism so reducing its size and cost.

3 Claims, 8 Drawing Sheets

POWER TRANSMISSION SYSTEM FOR FOUR-WHEEL DRIVE VEHICLES

BACKGROUND OF THE INVENTION

1. Field of the Invention

The present invention relates to a power transmission system for four-wheel drive vehicles which distributes a proportion of the torque of the main driven wheels which are directly driven by an engine to auxiliary driven wheels via a multiple disk clutch.

2. Description of the Related Art

Such a power transmission system for four-wheel drive vehicles is disclosed in FIG. 10 of Japanese Patent Application Laid-open No. 9-202152. In this system, a driving shaft which rotates in operative connection with front wheels which are the main driven wheels and a driven shaft which rotates in operative connection with rear wheels which are the auxiliary driven wheels are connected to each other via a multiple disk clutch, and a bidirectional clutch mechanism is provided on the aforementioned driven shaft. The bidirectional clutch mechanism has the function of enhancing the ground covering properties of the vehicle by being engaged when the front wheels slip, which causes the rotational rate of the front wheels to exceed the rotational rate of the rear wheels, thereby distributing the torque of the front wheels to the rear wheels when the vehicle is travelling either forward or backward, and the function of avoiding influencing the operation of the ABS (anti-lock braking system) by cancelling the engagement when the front wheels are locked, which causes the rotational rate of the front wheels to become lower than the rotational rate of the rear wheels, so as to prevent the torque of the front wheels from being distributed to the rear wheels.

In the above-mentioned conventional system, because the bidirectional clutch mechanism is provided on the driven shaft which transmits the torque of the front wheels to the rear wheels, the aforementioned torque is transmitted directly via the bidirectional clutch mechanism. Therefore, it is necessary to use a large and expensive bidirectional clutch mechanism having a large torque transmission capacity, which is the main cause of the increase in size and cost of the power transmission system.

SUMMARY OF THE INVENTION

The present invention has been conceived in view of the above-mentioned circumstances, and it is an object of the present invention to reduce the torque transmission capacity of a bidirectional clutch mechanism which is used in a power transmission system for four-wheel drive vehicles and to reduce the size and cost of the bidirectional clutch mechanism.

In accordance with a first aspect of the present invention, in order to achieve the above-mentioned object, a power transmission system for four-wheel drive vehicles is proposed for distributing a proportion of the torque of the main driven wheels which are directly driven by an engine to auxiliary driven wheels via a driving shaft, a multiple disk clutch and a driven shaft, comprising a torque cam mechanism which comprises a first cam element and a second cam element which can rotate relative to each other and which generates a thrust force for engaging the multiple disk clutch by the relative rotation of the two cam elements, a bidirectional clutch mechanism which comprises a first clutch element and a second clutch element which can rotate relative to each other and which engages the two clutch elements with each other regardless of the rotational direction of the first clutch element when the rotational rate of the first clutch element exceeds the rotational rate of the second clutch element and a load generating means comprising a first rotor and a second rotor which can rotate relative to each other which generates a rotational load by the relative rotation of the two rotors, wherein the driving shaft is connected to the first cam element of the torque cam mechanism, the second cam element of the torque cam mechanism is connected to the first rotor of the load generating means, the second rotor of the load generating means is connected to the first clutch element of the bidirectional clutch mechanism, and the second clutch element of the bidirectional clutch mechanism is connected to the driven shaft.

In accordance with a second aspect of the present invention, in addition to the above-mentioned first aspect, a power transmission system for four-wheel drive vehicles is proposed in which the above-mentioned load generating means is a hydraulic pump.

In accordance with a third aspect of the present invention, in addition to the above-mentioned first aspect, a power transmission system for four-wheel drive vehicles is proposed in which the above-mentioned load generating means is a power generator.

In accordance with the above-mentioned arrangements, the bidirectional clutch mechanism is in a disengaged state when the vehicle is travelling forward at a constant speed, where the rotational rate of the main driven wheels coincides with the rotational rate of the auxiliary driven wheels and when the vehicle is braking when travelling forward where the rotational rate of the main driven wheels is less than the rotational rate of the auxiliary driven wheels. As a result, the second rotor of the load generating means rotates under no load by being dragged by the first rotor, the torque cam mechanism does not transmit any torque and no thrust force is thus generated, the multiple disk clutch is disengaged, and the vehicle is maintained in a two-wheel drive state.

Because the bidirectional clutch mechanism is in an engaged state when the vehicle starts to travel forward and when the vehicle accelerates in the forward direction where the rotational rate of the main driven wheels exceeds the rotational rate of the auxiliary driven wheels, the first clutch element of the bidirectional clutch mechanism brakes the second rotor of the load generating means so causing rotation relative to the first rotor. As a result, the load generating means generates a load, the torque cam mechanism transmits the torque so as to generate a thrust force, the multiple disk clutch is therefore engaged and the vehicle switches over to a four-wheel drive state.

When the vehicle is travelling backward the direction in which each of the elements of the power transmission system rotates is opposite to the rotational direction when the vehicle is travelling forward, and since the bidirectional clutch mechanism engages the first clutch element with the second clutch element regardless of the rotational direction of the first clutch element when the rotational rate of the first clutch element exceeds the rotational rate of the second clutch element, the bidirectional clutch mechanism is disengaged when the vehicle is travelling backward at a constant speed and when the vehicle is being braked backward in the same manner as when it is travelling forward so as to maintain the vehicle in a two-wheel drive state, and the bidirectional clutch mechanism is engaged so as to switch the vehicle over to a four-wheel drive state when the vehicle starts to travel backward and when the vehicle accelerates backward.

Torque transmitted from the main driven wheels to the auxiliary driven wheels is not directly applied to the bidirectional clutch mechanism; only a small torque which is transmitted by the torque cam mechanism is applied to the bidirectional clutch mechanism, and it is therefore possible to decrease the torque transmission capacity of the bidirectional clutch mechanism, thereby reducing the size and the cost thereof.

With regard to the load generating means, a hydraulic pump or a power generator can be used.

The above-mentioned objects, other objects, characteristics and advantages of the present invention will become apparent from an explanation of preferable embodiments which will be described in detail below by reference to the attached drawings.

BRIEF DESCRIPTION OF THE DRAWINGS

FIG. 1 to FIG. 6 illustrate a first embodiment of the present invention.

FIG. 1 is a diagram showing the arrangement of the entire power transmission line of a four-wheel drive vehicle.

FIG. 2 is a diagram showing the structure of a power transmission system.

FIG. 4 is an enlarged cross sectional view at line 4—4 in FIG. 2.

FIG. 5A, FIG. 5B and FIG. 5C are diagrams for explaining the action of a bidirectional clutch mechanism.

FIG. 6 is a schematic view showing the power transmission path.

DESCRIPTION OF THE PREFERRED EMBODIMENTS

Practical features of the present invention are explained below by reference to embodiments of the present invention shown in the attached drawings.

FIG. 1 to FIG. 6 illustrate the first embodiment of the present invention.

Figure 1:
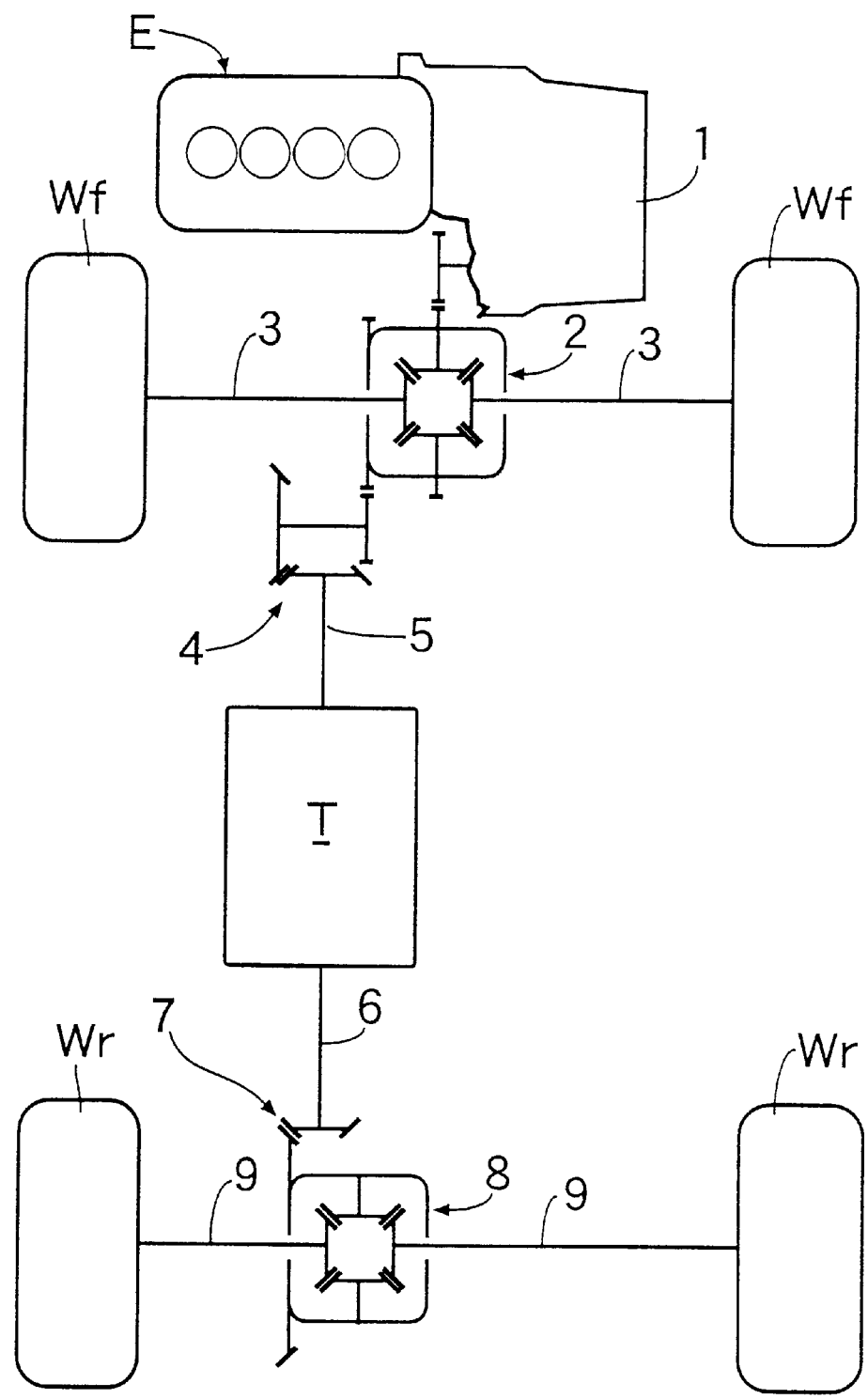

As shown in FIG. 1, the output from an engine E mounted in the front part of a four-wheel drive vehicle is input into a differential gear 2 at the front via a transmission 1, the output from the differential gear 2 is transmitted to right and left front wheels Wf, Wf, which are main driven wheels, via drive shafts 3, 3. Furthermore, the output from the engine E which has been input into the differential gear 2 is input to a power transmission system T which is described hereinafter, via a bevel gear 4 and a driving shaft 5, the output from the power transmission system T is transmitted to a differential gear 8 at the rear via a driven shaft 6 and a bevel gear 7, and furthermore the output from the differential gear 8 is transmitted to right and left rear wheels Wr, Wr, which are auxiliary driven wheels, via drive shafts 9, 9.

Figure 2:
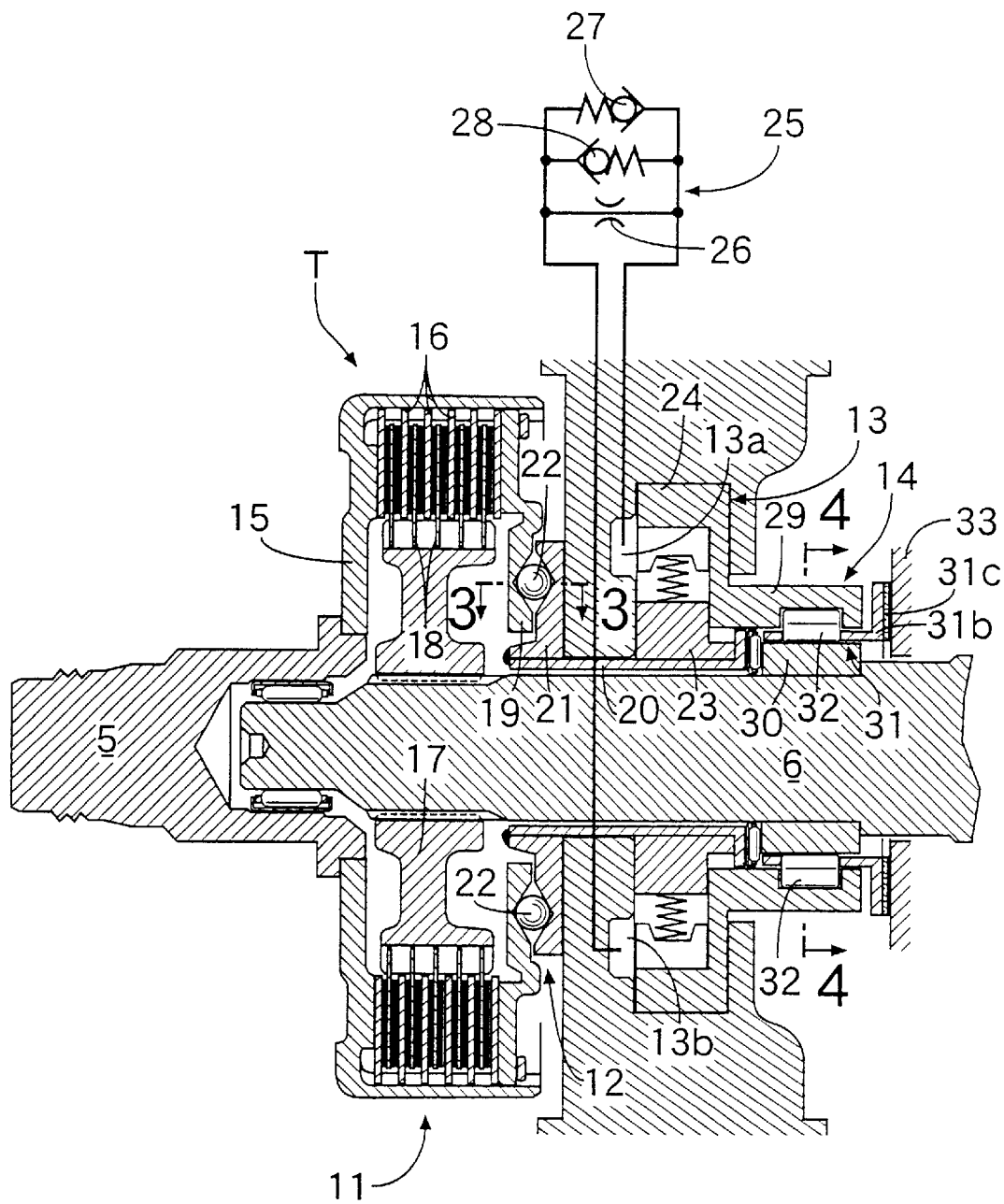

As shown in FIG. 2, the power transmission system T which is placed between the driving shaft S which rotates in operative connection with the rotation of the front wheels Wf, Wf and the driven shaft 6 which rotates in operative connection with the rotation of the rear wheels Wr, Wr comprises a multiple disk clutch 11, a torque cam mechanism 12, a hydraulic pump 13 and a bidirectional clutch mechanism 14 which are placed in that order from the driving shaft 5 side to the driven shaft 6 side.

The multiple disk clutch 11 governs the transmission and blocking of torque between the driving shaft 5 and the driven shaft 6 and is formed by alternately superimposing a plurality of frictional engagement members 16 . . . supported on a clutch outer 15 which rotates together with the driving shaft 5 and a plurality of frictional engagement members 18 . . . supported on a clutch inner 17 which rotates together with the driven shaft 6, and the two frictional engagement members 16 . . . , 18 . . . come into close contact with each other by receiving a thrust force from the torque cam mechanism 12, which is described hereinafter so as to engage the driving shaft 5 with the driven shaft 6. In the state in which the multiple disk clutch 11 is engaged, torque is transmitted from the front wheels Wf, Wf to the rear wheels Wr, Wr, and in the state in which the engagement of the multiple disk clutch 11 is released, the transmission of torque from the front wheels Wf, Wf to the rear wheels Wr, Wr is blocked.

Figure 3A:
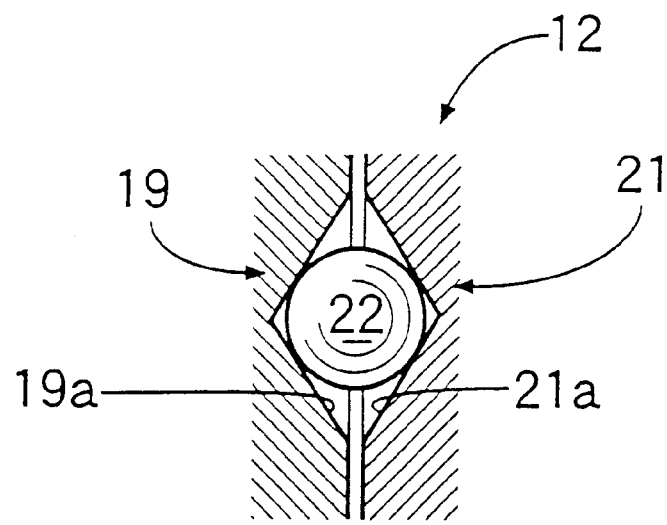
FIG. 3A and FIG. 3B are enlarged cross sectional views at line 3—3 in FIG. 2.
Figure 3B:
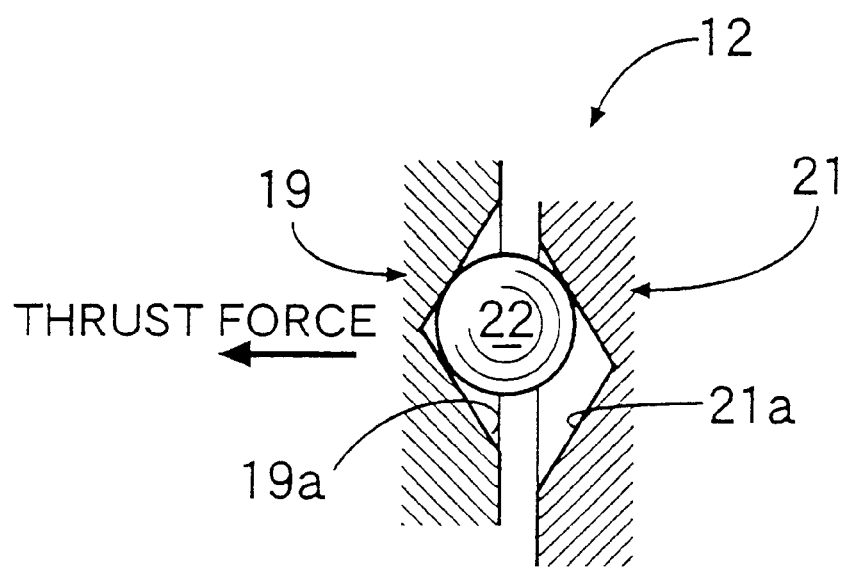

As is clear by referring to FIG. 3A and FIG. 3B together with FIG. 2, the torque cam mechanism 12 comprises a first cam element 19 which is connected by splines to the clutch outer 15 and a second cam element 21 which is connected to the forward end of a sleeve 20 coaxially fitted around an outer circumference of the driven shaft 6, and a plurality of balls 22 . . . are supported between the plurality of triangular cam channels 19a . . . , 21a . . . which are formed on the surfaces of the first cam element 19 and the second cam element 21, respectively, that face each other.

The hydraulic pump 13 which forms a load generating means of the present invention comprises, for example, a known vane pump; a pump rotor which forms a first rotor 23 of the load generating means is connected to the rear end of the aforementioned sleeve 20 and a cam ring which forms a second rotor 24 of the load generating means is connected to a first clutch element 29 of the bidirectional clutch mechanism 14 which is described hereinafter. The hydraulic pump 13 comprises a first port 13a and a second port 13b; when the first rotor 23 and the second rotor 24 rotate relative to each other in one direction the hydraulic oil which is taken in through the first port 13a discharges into the second port 13b, and when the first rotor 23 and the second rotor 24 rotate relative to each other in the other direction the hydraulic oil which is taken in through the second port 13b discharges into the first port 13a.

A hydraulic circuit 25 which is connected to the hydraulic pump 13 is formed by connecting in parallel an orifice 26 which is placed between the first port 13a and the second port 13b, a relief valve 27 which opens when the oil pressure of the first port 13a exceeds the oil pressure of the second port 13b by a predetermined value, and a relief valve 28 which opens when the oil pressure of the second port 13b exceeds the oil pressure of the first port 13a by a predetermined value.

Figure 4:
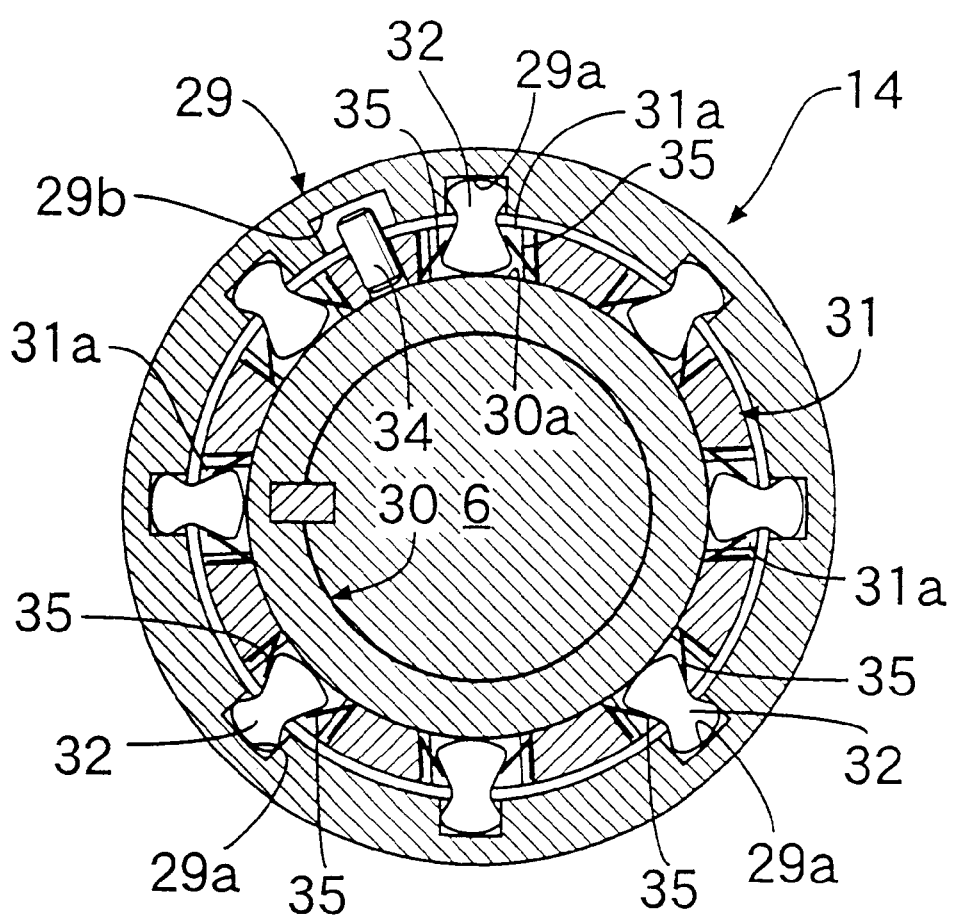
Figure 5:
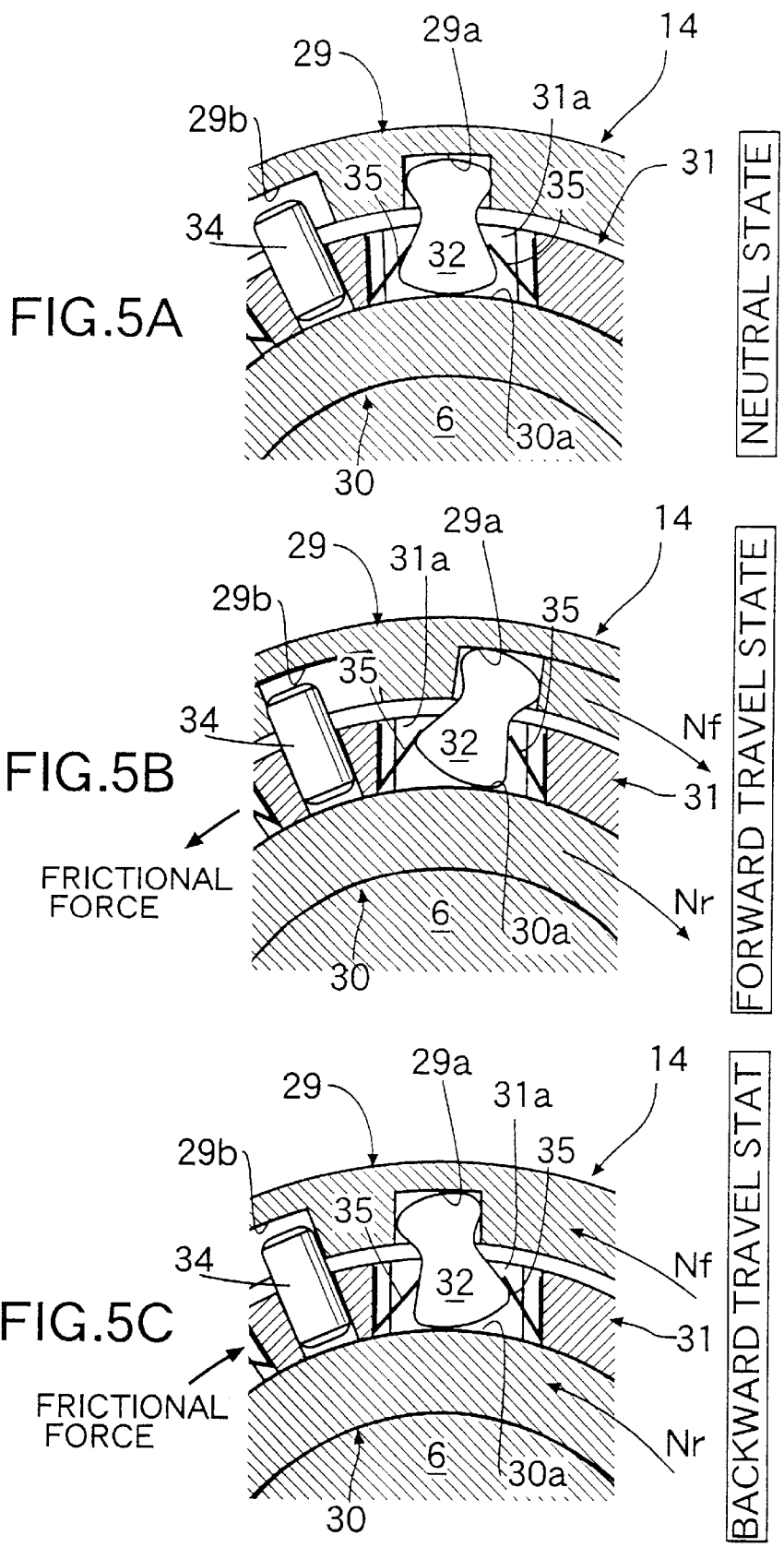

As is clear by referring to FIG. 4 together with FIG. 2, the bidirectional clutch mechanism 14 comprises a ring-shaped first clutch element 29 which is positioned outermost in the radial direction and is connected to the second rotor 24 of the hydraulic pump 13, a second clutch element 30 which is positioned coaxially inside the first clutch element 29 and is connected to the outer circumference of the driven shaft 6, an annular retainer 31 which is placed in a rotatable manner between the first and second clutch elements 29, 30, and a plurality of sprags 32 . . . which are supported so as to fit inside a plurality of pockets 31*a* . . . formed in the retainer 31 at predetermined intervals and a plurality of indentations 29*a* . . . formed on the inner circumference of the first clutch element 29 at these predetermined intervals. The indentations 29*a* . . . are formed on the inner circumference of the first clutch element 29, which is the outer of the two clutch elements, and a circular surface 30*a* is formed on the outer circumference of the second clutch element 30, which is the inner of the two clutch elements. The sprags 32 . . . are therefore retained by being surrounded by the indentations 29*a* . . . of the first clutch element 29, the circular surface 30*a* of the second clutch element 30 and the pockets 31*a* . . . of the retainer 31.

Shoes 31*c* . . . provided at the tip end of arms 31*b* . . . which extend from the retainer 31 are frictionally engaged in a slidable manner with the inner surface of a casing 33 of the power transmission system T. A pin 34 which protrudes from the retainer 31 in the radial direction engages with a notch 29*b* formed on the inner circumference of the first clutch element 29 so as to limit the angular range over which the retainer 31 is capable of rotating relative to the first clutch element 29. Furthermore, the retainer 31 and the sprags 32 . . . are urged towards the neutral position shown in FIG. 5A by means of springs 35 . . . , 35 . . . which are provided at both edges of the pockets 31*a* . . . of the retainer 31.

Figure 6:
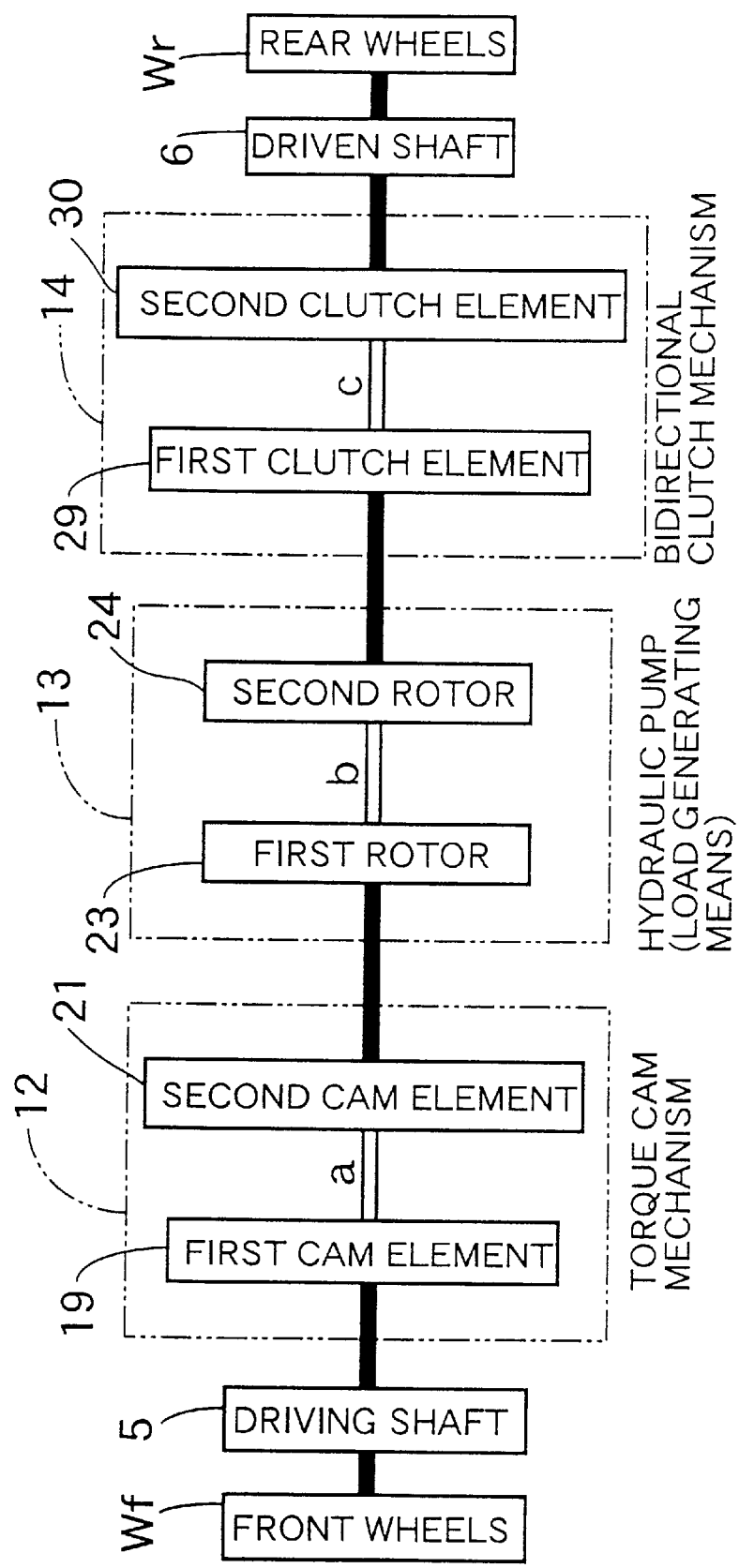

FIG. 6 is a schematic diagram of the power transmission path of the power transmission system T, which will assist in the understanding of the structure thereof. As shown in the figure, the front wheels Wf, Wf, the driving shaft 5, the first cam element 19 and the second cam element 21 of the torque cam mechanism 12, the first rotor 23 and the second rotor 24 of the hydraulic pump 13, the first clutch element 29 and the second clutch element 30 of the bidirectional clutch mechanism 14, the driven shaft 6 and the rear wheels Wr, Wr are connected in series. Thick solid lines linking each of the components with each other denote direct connections which do not allow relative rotation and fine double lines, a, b, and c denote connections which do allow relative rotation.

An action of the embodiment of the present invention comprising the aforementioned arrangement is explained by reference mainly to FIG. 6.

(1) When travelling forward at a constant speed

When a vehicle is travelling forward at a constant speed in which the front wheels Wf, Wf and the rear wheels Wr, Wr rotate at the same speed, the engagement of the multiple disk clutch 11 is released, and the distribution of torque from the front wheels Wf, Wf to the rear wheels Wr, Wr is blocked so as to put the vehicle in a two-wheel drive state. The action when travelling forward at a constant speed is explained below.

Rotation of the front wheels Wf, Wf, which are driven by the engine E, is transmitted to the torque cam mechanism 12 through the driving shaft 5. Because the torque cam mechanism 12 has the structure in which balls 22 . . . are held between the cam channels 19*a* . . . of the first cam element 19 and the cam channels 21*a* . . . of the second cam element 21, rotation of the first cam element 19 is transmitted to the second cam element 21 via the balls 22 . . . . At this stage, since a load is not being applied to the second cam element 21 as described hereinafter, the torque cam mechanism 12 does not transmit substantial torque, the first cam element 19 and the second cam element 21 do not rotate relative to each other (see FIG. 3A), and the torque cam mechanism 12 does not generate a thrust force for engaging the multiple disk clutch 11.

When the rotation is transmitted to the first rotor 23 of the hydraulic pump 13 which is connected to the second cam element 21 of the torque cam mechanism 12, since a load is not being applied to the second rotor 24 as described hereinafter, the second rotor 24 is dragged by the rotation of the first rotor 23 and rotates at the same speed as that of the first rotor 23, and the hydraulic pump 13 idles with no load, neither taking in nor discharging any hydraulic oil.

The first clutch element 29 of the bidirectional clutch mechanism 14 rotates by being connected to the second rotor 24 of the hydraulic pump 13, the second clutch element 30 rotates by being connected to the rear wheels Wr, Wr via the driven shaft 6, and at this stage since the rotational rate of the front wheels Wf, Wf coincides with the rotational rate of the rear wheels Wr, Wr, the first and second clutch elements 29, 30 of the bidirectional clutch mechanism 14 rotate in the same direction at the same speed, thereby, bringing about a slip state in which no torque is transmitted.

That is to say, as shown in FIG. 5B if the second clutch element 30 of the bidirectional clutch mechanism 14, which rotates in operative connection with the rotation of the rear wheels Wr, Wr, rotates in the forward direction shown by the arrow Nr, the retainer 31 which is dragged by the second clutch element 30 also rotates in the forward direction, but because the retainer 31 is retarded by the shoes 31*c* . . . (see FIG. 2) which frictionally engage with the casing 33, the rotation of the retainer 31 is retarded by a predetermined angle relative to the first clutch element 29, and the pin 34 stops at a position in which it is in contact with one edge of the notch 29*b* of the first clutch element 29 (FIG. 5B). In this state torque is transmitted from the first clutch element 29 to the second clutch element 30 only when the rotational rate Nf of the first clutch element 29 in the forward direction exceeds the rotational rate Nr of the second clutch element 30 in the forward direction, and no torque is transmitted from the first clutch element 29 to the second clutch element 30 when the rotational rate Nf of the first clutch element 29 in the forward direction coincides with or becomes less than the rotational rate Nr of the second clutch element 30 in the forward direction.

As hereinbefore described, when the vehicle is travelling forward at a constant speed in which the rotational rates Nf, Nr of the first clutch element 29 and the second clutch element 30 coincide with each other, the bidirectional clutch mechanism 14 is not engaged, and because the first clutch element 29 can rotate with no load the second rotor 24 of the hydraulic pump 13 which is connected to the first clutch element 29 can rotate without any load. Therefore, torque transmission between the first cam element 19 and the second cam element 21 of the torque cam mechanism 12 does not occur, the phases of the first and second cam elements 19, 21 are maintained in the state shown in FIG. 3A, and the torque cam mechanism 12 does not generate a thrust force for engaging the multiple disk clutch 11.

(2) When starting to travel forward or accelerating forward

When the front wheels Wf, Wf slip as a result of a rapid start or rapid acceleration on a road surface having a low coefficient of friction, the rotational rate of the front wheels Wf, Wf exceeds the rotational rate of the rear wheels Wr, Wr, the multiple disk clutch 11 is engaged, torque is distributed from the front wheels Wf, Wf to the rear wheels Wr, Wr and the vehicle is put into a four-wheel drive state. The action when starting to travel forward or accelerating forward is explained below.

At the above-mentioned time when the vehicle is travelling forward at a constant speed, the rotational rates Nf, Nr of the first clutch element 29 and the second clutch element 30 of the bidirectional clutch mechanism 14 become identical, but when the front wheels Wf, Wf slip the rotational rate Nf of the first clutch element 29 of the bidirectional clutch mechanism 14, which is operatively connected to the rotation of the front wheels Wf, Wf exceeds the rotational rate Nr of the second clutch element 30, which is operatively connected to the rotation of the rear wheels Wr, Wr. When the rotational rate Nf of the first clutch element 29 in the forward direction exceeds the rotational rate Nr of the second clutch element 30 in the forward direction in FIG. 5B, the bidirectional clutch mechanism 14 is engaged and the first clutch element 29 and the second clutch element 30 are joined together.

At this stage the rotational rate Nr of the second clutch element 30, which is directly connected to the rear wheels Wr, Wr via the driven shaft 6 is unchanged, but the rotational rate Nf of the first clutch element 29, which is connected to the front wheels Wf, Wf via the hydraulic pump 13 and the torque cam mechanism 12 is decreased to the same level as the rotational rate Nr of the second clutch element 30 as a result of the load which is applied by the second clutch element 30. When the rotation of the first clutch element 29 of the bidirectional clutch mechanism 14 is thus braked, since the rotation of the second rotor 24 of the hydraulic pump 13 which is connected to the first clutch element 29 is also braked, the first rotor 23 and the second rotor 24 rotate relative to each other so as to discharge hydraulic oil from the first port 13a, and this hydraulic oil returns to the second port 13b passing through the orifice 26 so as to generate a rotational load in the hydraulic pump 13. In addition, when the discharge pressure of the hydraulic pump 13 reaches an upper limit the one relief valve 27 opens so as to restrain the rotational load applied to the hydraulic pump 13 to an upper limit.

When the rotational load so generated in the hydraulic pump 13 brakes the rotation of the first rotor 23, a difference in rotation is caused between the second cam element 21 of the torque cam mechanism 12, which rotates by being connected to the first rotor 23 and the first cam element 19 of the torque cam mechanism 12, which rotates by being connected to the front wheels Wf, Wf. The phases of the cam channel 19a of the first cam element 19 and the cam channel 21a of the second cam element 21 are displaced so as to generate a thrust force (FIG. 3B), and this thrust force makes the frictional engagement members 16 . . . , 18 . . . of the multiple disk clutch 11 come into close contact with each other so as to engage them. As a result, the torque of the front wheels Wf, Wf is distributed to the rear wheels Wr, Wr via the driving shaft 5, the multiple disk clutch 11 and the driven shaft 6 and the vehicle is put into a four-wheel drive state.

Thus, when the front wheels Wf, Wf slip a proportion of the torque of the above-mentioned front wheels Wf, Wf is distributed to the rear wheels Wr, Wr so putting the vehicle in a four-wheel drive state, and the ground covering properties of the vehicle can be improved. Moreover, the level of torque distributed to the rear wheels Wr, Wr can be increased according to the increase in the difference between the rotational rate of the front wheels Wf, Wf and that of the rear wheels Wr, Wr, that is to say, according to the increase in the degree of slip of the front wheels Wf, Wf. The torque transmission from the front wheels Wf, Wf to the rear wheels Wr, Wr is carried out by the multiple disk clutch 11, only a small amount of the torque which is applied between the first and second cam elements 19, 21 of the torque cam mechanism 12 is transmitted to the bidirectional clutch mechanism 14 and, therefore, not only can the size and weight be reduced by using the bidirectional clutch mechanism 14 having a small torque transmission capacity, but the durability can also be enhanced.

(3) When braking while travelling forward

When a vehicle travelling forward on a road surface having a low coefficient of friction is braked rapidly, because the braking force applied to the front wheels Wf, Wf is set so as to be larger than the braking force applied to the rear wheels Wr, Wr, there are cases in which the front wheels lock first and the rotational rate of the rear wheels Wr, Wr exceeds the rotational rate of the front wheels Wf, Wf. If the multiple disk clutch 11 is engaged and the vehicle is put into a four-wheel drive state in such cases, because there is a possibility that the operation of the ABS (anti-lock braking system) might be affected so degrading the braking performance, it is necessary to maintain the vehicle in a two-wheel drive state when braking while travelling forward. The action when braking while travelling forward is explained below.

At the aforementioned time when travelling forward at a constant speed, the rotational rates Nf, Nr of the first clutch element 29 and the second clutch element 30 of the bidirectional clutch mechanism 14 are identical, but if the front wheels Wf, Wf are locked, the rotational rate Nf of the first clutch element 29 of the bidirectional clutch mechanism 14, which is operatively connected to the rotational rate of the front wheels Wf, Wf, becomes less than the rotational rate Nr of the second clutch element 30, which is operatively connected to the rotation of the rear wheels Wr, Wr. When the rotational rate Nf of the first clutch element 29 in the forward direction becomes less than the rotational rate Nr of the second clutch element 30 in the forward direction in FIG. 5B, the bidirectional clutch mechanism 14 is disengaged and the first clutch element 29 and the second clutch element 30 are separated from each other.

That is to say, because the first clutch element 29 of the bidirectional clutch mechanism 14 can rotate at a rotational rate less than that of the second clutch element 30 without receiving any load from the second clutch element 30, rotation of the second rotor 24 of the hydraulic pump 13, which is connected to the second clutch element 30, is not restrained, and the first rotor 23 and the second rotor 24 of the hydraulic pump 13 therefore rotate at the same speed in a state in which no load is being applied. As a result, the first cam element 19 and the second cam element 21 of the torque cam mechanism 12 rotate in the same phase without transmitting any torque, and because no thrust force for engaging the multiple disk clutch 11 is generated the vehicle is maintained in a two-wheel drive state.

(4) When travelling backward

When a vehicle is travelling backward it can switch between a two-wheel drive state and a four-wheel drive state in the same manner as in the above-mentioned case when it is travelling forward. In detail, the two-wheel drive state is maintained when travelling backward at a constant speed or in the case where the front wheels Wf, Wf are locked when braking while the vehicle is travelling backward, and it is switched over to the four-wheel drive state in the case where the front wheels Wf, Wf slip when starting to travel backward or when travelling backward with rapid acceleration. The action when travelling backward is explained below.

When a vehicle is travelling backward, since the rotational direction of all the elements in FIG. 6 are reversed, the second clutch element 30 of the bidirectional clutch mechanism 14 rotates in the direction shown by the arrow Nr in FIG. 5C. As a result, the retainer 31 which is dragged by the rotation of the second clutch element 30 in the reverse direction rotates in the reverse direction, but because the retainer 31 is braked by the shoes 31c . . . which frictionally engage with the casing 33 (FIG. 2), its rotation is retarded relative to the first clutch element 29 by a predetermined angle in the rotational direction so as to be in the state shown in FIG. 5C. In this state it is only when the rotational rate Nf of the first clutch element 29 in the reverse direction exceeds the rotational rate Nr of the second clutch element 30 in the reverse direction that a torque is transmitted from the first clutch element 29 to the second clutch element 30, and when the rotational rate Nf of the first clutch element 29 in the reverse direction coincides with or becomes less than the rotational rate Nr of the second clutch element 30 in the reverse direction, no torque is transmitted from the first clutch element 29 to the second clutch element 30.

As hereinbefore described, because the bidirectional clutch mechanism 14 is not engaged when the vehicle is travelling backward at a constant speed where the rotational rates Nf, Nr of the first clutch element 29 and the second clutch element 30 coincide with each other, and when the vehicle is braked while travelling backward where the rotational rate Nf of the first clutch element 29 becomes less than the rotational rate Nr of the second clutch element 30 and the first clutch element 29 can rotate without a load, the second rotor 24 of the hydraulic pump 13, which is connected to the first clutch element 29, can rotate without a load. Therefore, no torque is transmitted between the first cam element 19 and the second cam element 21 of the torque cam mechanism 12, and the multiple disk clutch 11 is disengaged so as to maintain a two-wheel drive state.

When the front wheels Wf, Wf slip when the vehicle is starting to travel backward and when the vehicle is rapidly accelerating while travelling backward thereby causing the rotational rate Nf of the first clutch element 29 to exceed the rotational rate Nr of the second clutch element 30, the bidirectional clutch mechanism 14 is engaged and the first clutch element 29 is braked by receiving a load from the second clutch element 30. As a result, the first rotor 23 and the second rotor 24 of the hydraulic pump 13 rotate relative to each other so as to generate a rotational load, torque is transmitted between the first cam element 19 and the second cam element 21 of the torque cam mechanism 12 so generating a thrust force, and the multiple disk clutch 11 is engaged by this thrust force and the vehicle is put into a four-wheel drive state.

In addition, the rotational direction of the hydraulic pump 13 when the vehicle is starting to travel backward or is rapidly accelerating while travelling backward is the reverse of that when the vehicle is starting to travel forward or is rapidly accelerating forward; the first port 13a becomes an induction port and the second port 13b becomes a discharge port. Therefore, the upper limit for the oil pressure is restrained by the other relief valve 28.

Figure 7:
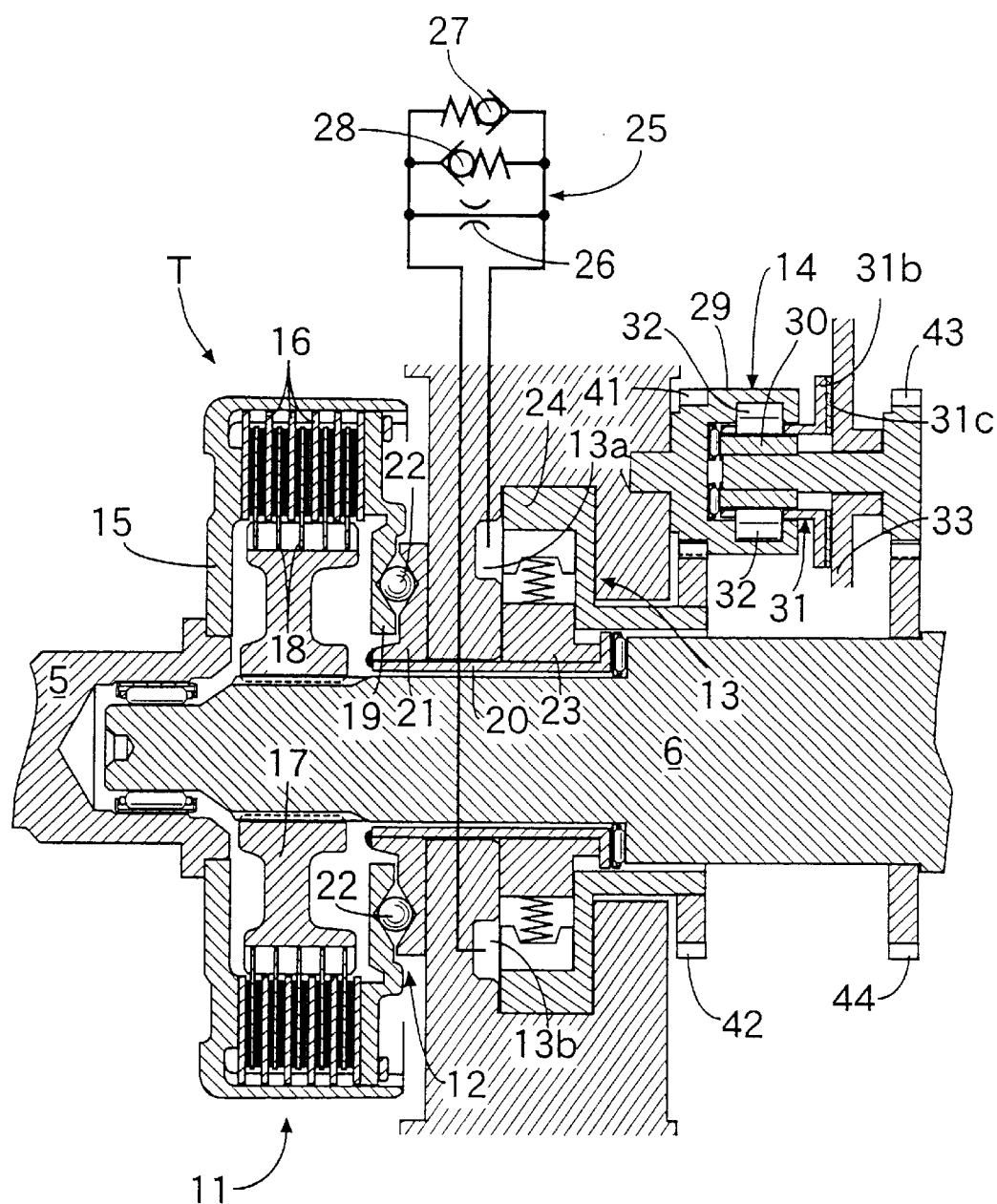
FIG. 7 is a diagram showing the structure of a power transmission system of a second embodiment of the present invention.

The second embodiment of the present invention is explained by reference to FIG. 7. The second embodiment differs from the aforementioned first embodiment in terms of the layout of the bidirectional clutch mechanism 14. That is to say, in the first embodiment the bidirectional clutch mechanism 14 is placed coaxially on the driven shaft 6, but in the second embodiment the bidirectional clutch mechanism 14 is placed at a position away from the driven shaft 6. A gear 41 provided on the first clutch element 29 of the bidirectional clutch mechanism 14 meshes with a gear 42 provided on the second rotor 24 of the hydraulic pump 13, and a gear 43 provided on the second clutch element 30 of the bidirectional clutch mechanism 14 meshes with a gear 44 provided on the driven shaft 6. In this case, the gear ratio of the two gears 41, 42 on the first clutch element 29 side coincides with the gear ratio of the two gears 43, 44 on the second clutch element 30 side.

Figure 8:
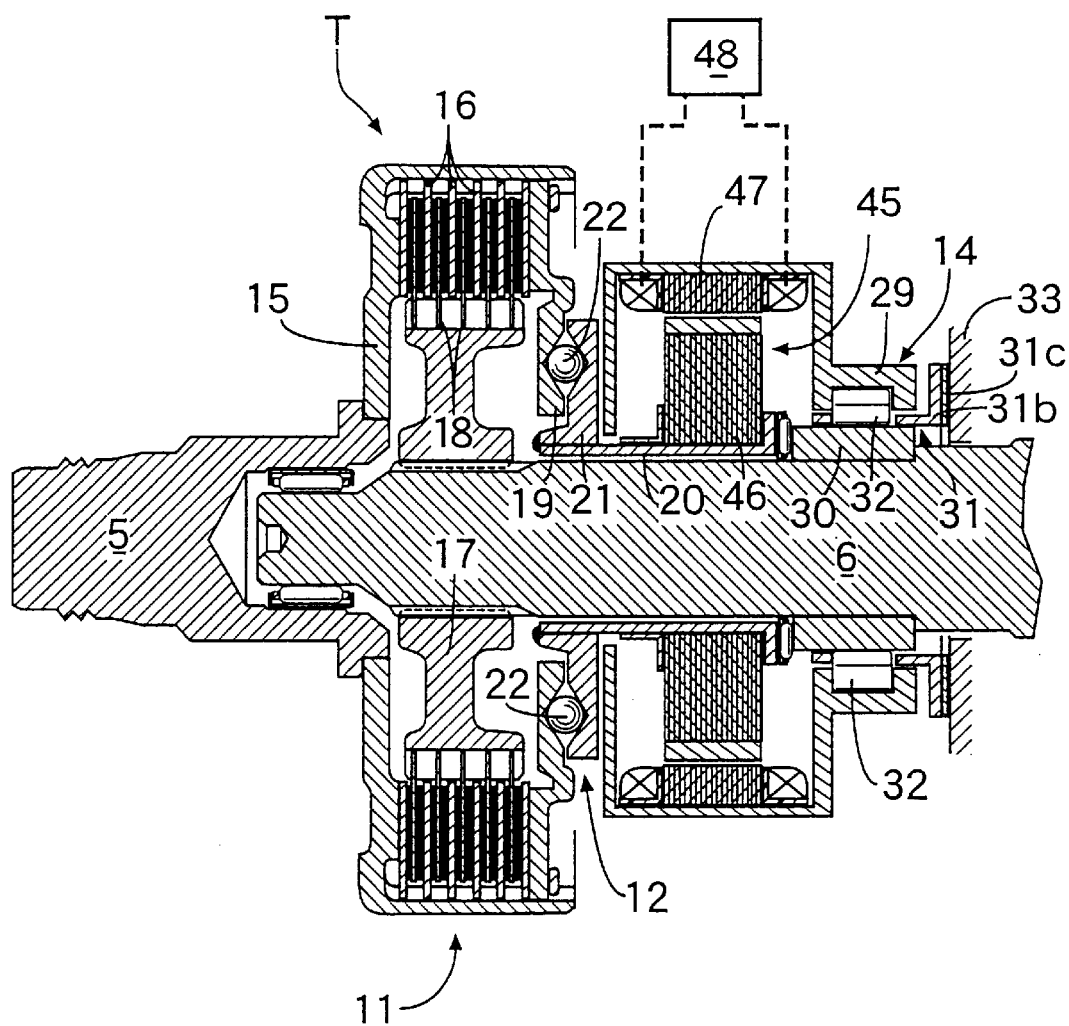
FIG. 8 is a diagram showing the structure of a power transmission system of a third embodiment of the present invention.

The third embodiment of the present invention is explained by reference to FIG. 8.

In the third embodiment a power generator 45 is used as the load generating means instead of the hydraulic pump 13 of the first embodiment. The power generator 45 comprises a first rotor 46 which forms a power generator rotor on the inner side thereof and a second rotor 47 which forms a stator on the outer side thereof; the first rotor 46 is connected to the second cam element 21 of the torque cam mechanism 12 via the sleeve 20, and the second rotor 47 is connected to the first clutch element 29 of the bidirectional clutch mechanism 14. Both ends of the coil of the second rotor 47 are connected to a controller 48. When the first rotor 46 and the second rotor 47 of the power generator 45 rotate relative to each other, since the load so generated acts so as to suppress the rotation of the first rotor 46, it can exhibit the same function as that of the hydraulic pump 13 of the first embodiment.

Thus, the same operational effects as those obtained by the first embodiment can be achieved by the second and third embodiments.

The embodiments of the present invention are explained in detail above, but the present invention can be modified in a variety of ways without departing from the spirit and scope of the invention.

For example, the structure of the bidirectional clutch mechanism 14 is not limited to that described in the embodiments, and rollers may be used instead of the sprags 32.

What is claimed is:

1. A power transmission system for four-wheel drive vehicles for distributing a proportion of the torque of the main driven wheels which are directly driven by an engine to auxiliary driven wheels via a driving shaft, a multiple disk clutch and a driven shaft, comprising:
    a torque cam mechanism comprising a first cam element and a second cam element which are capable of rotating relative to each other, the torque cam mechanism generating a thrust force for engaging the multiple disk clutch by the relative rotation of the two cam elements;
    a bidirectional clutch mechanism comprising a first clutch element and a second clutch element which are capable of rotating relative to each other, the bidirectional clutch mechanism engaging the two clutch elements with each other regardless of the rotational direction of the first clutch element when the rotational rate of the first clutch element exceeds the rotational rate of the second clutch element; and
    a load generating means which comprises a first rotor and a second rotor which are capable of rotating relative to each other, the load generating means generating a rotational load by the relative rotation of the two rotors,
    wherein the driving shaft is connected to the first cam element of the torque cam mechanism, the second cam element of the torque cam mechanism is connected to the first rotor of the load generating means, the second rotor of the load generating means is connected to the first clutch element of the bidirectional clutch mechanism, and the second clutch element of the bidirectional clutch mechanism is connected to the driven shaft.

2. A power transmission system for four-wheel drive vehicles according to claim 1, wherein said load generating means comprises a hydraulic pump.

3. A power transmission system for four-wheel drive vehicles according to claim 1, wherein said load generating means comprises a power generator.

* * * * *